United States Patent [19]

Wang

[11] Patent Number: 4,974,433

[45] Date of Patent: Dec. 4, 1990

[54] CAR LOCK FOR LOCKING BOTH THE STEERING WHEEL AND A STEREO RECEIVER OF A CAR

[76] Inventor: Jin-Yuan Wang, No. 59, Sec. 1, Hsi-An Rd., Pu-Li Chen, Nan-Tun Hsien, Taiwan

[21] Appl. No.: 431,072

[22] Filed: Nov. 3, 1989

[51] Int. Cl.⁵ ............................................. B60R 25/02
[52] U.S. Cl. ...................................... 70/211; 70/237; 70/238; 70/258
[58] Field of Search .......................... 70/237, 225–227, 70/209, 211, 212, 57, 58, 238, 239, 254, 258

[56] References Cited

U.S. PATENT DOCUMENTS

| | | | |
|---|---|---|---|
| 4,131,173 | 12/1978 | Boersma | 70/258 X |
| 4,738,127 | 4/1988 | Johnson | 70/209 |
| 4,825,671 | 5/1989 | Wu | 70/211 X |

FOREIGN PATENT DOCUMENTS

| | | | |
|---|---|---|---|
| 106072 | 12/1966 | Denmark | 70/209 |
| 513332 | 11/1930 | Fed. Rep. of Germany | 70/211 |
| 2924103 | 7/1980 | Fed. Rep. of Germany | 70/238 |
| 2039840 | 8/1980 | United Kingdom | 70/209 |

Primary Examiner—Lloyd A. Gall
Attorney, Agent, or Firm—Cushman, Darby & Cushman

[57] ABSTRACT

A car lock includes an elongated tube to which a first lock hook is fixed and a second lock hook is movably mounted. A connecting member is provided for pivotally interconnecting a locking rod and the elongated tube so that the locking rod can be rotated to a position substantially perpendicular to the elongated tube and an abutting plate, rotatably connected to the locking rod, can be brought into contact with a stereo receiver detachably received in the dashboard of a car. The locking rod passes through a positioning member so that the second lock hook can be inserted into a channel formed in the positioning member when the second lock hook is moved to hook the steering wheel of the car and the locking rod is rotated to a position substantially perpendicular to the elongated tube. A locking mechanism is provided for preventing the locking rod from moving relative to the positioning member and preventing the second lock hook from moving relative to the elongated tube, so that the second lock hook and the locking rod can be locked.

4 Claims, 8 Drawing Sheets

CAR LOCK FOR LOCKING BOTH THE STEERING WHEEL AND A STEREO RECEIVER OF A CAR

BACKGROUND OF THE INVENTION

This invention relates to a car lock, more particularly to a car lock which locks both the steering wheel of a car and the stereo receiver detachably mounted in the car.

Conventionally, a car can be protected from burglary by the use of a car lock which locks the steering wheel to the gas pedal thereof. However, it has been found that the car stereo receiver, which is detachably received in the dashboard of the car, is usually stolen because said stereo receiver can not be locked in said dashboard.

SUMMARY OF THE INVENTION

It is therefore a main object of this invention to provide a car lock which can lock both the steering wheel of a car and the stereo receiver detachably received in the car.

Accordingly, a car lock of this invention for locking both a steering wheel of a car and a stereo receiver detachably received in the dashboard of said car includes an elongated tube having a first end, to which a first lock hook is fixed, and a second end. A second lock hook is movably mounted to the elongated tube. A locking rod has an abutting plate rotatably connected to an end thereof. A means is provided for pivotally interconnecting the locking rod and the second end of the elongated tube so that the locking rod can be rotated to a position where said locking rod is substantially perpendicular to the elongated tube and the abutting plate can be brought into contact with the stereo receiver. The locking rod passes through a positioning member which has a channel formed therein extending in a direction substantially perpendicular to said locking rod so that the second lock hook can be inserted into the channel of the positioning member when the second lock hook is moved to hook the steering wheel and said locking rod is rotated to a position substantially perpendicular to the elongated tube. A locking means is provided for preventing the locking rod from moving relative to the positioning member and preventing the second lock hook from moving relative to the elongated tube, so that said second lock hook and said locking rod can be locked. Therefore, the first lock hook is hooked on a predetermined portion of the car while the second lock hook is hooked on the steering wheel and inserted into the channel of the positioning member, and the abutting plate abuts against the stereo receiver. In addition, the second lock hook and the locking rod are locked with respect to the elongated tube and the positioning member. In this manner, the steering wheel is locked against rotation and the stereo receiver, detachably received in the dashboard, is locked against being pulled out from the dashboard.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
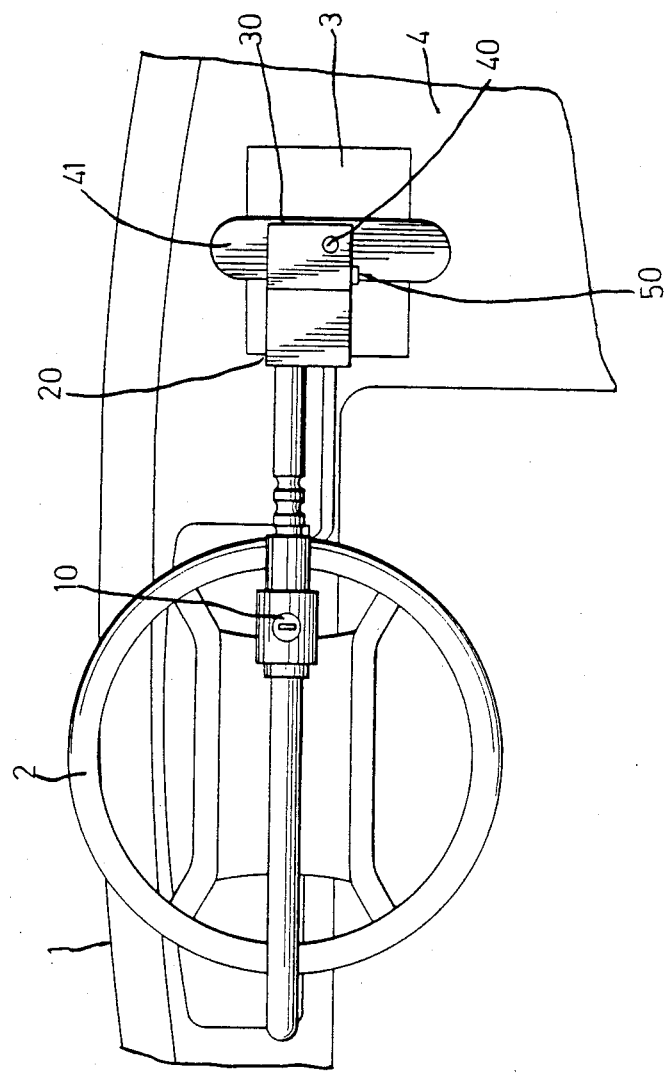
FIG. 1 is a schematic view showing a first preferred embodiment of a car lock of this invention in an operative position.
Figure 2:
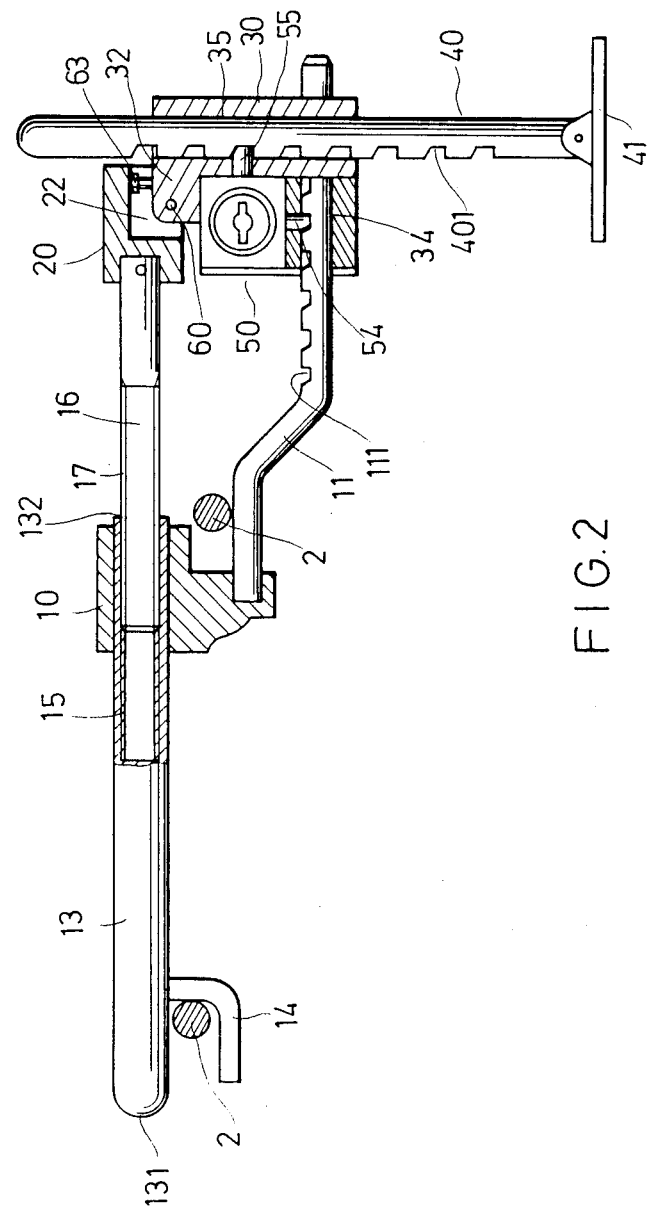
FIG. 2 is a partially sectional view of a first preferred embodiment of a car lock of this invention.
Figure 3:
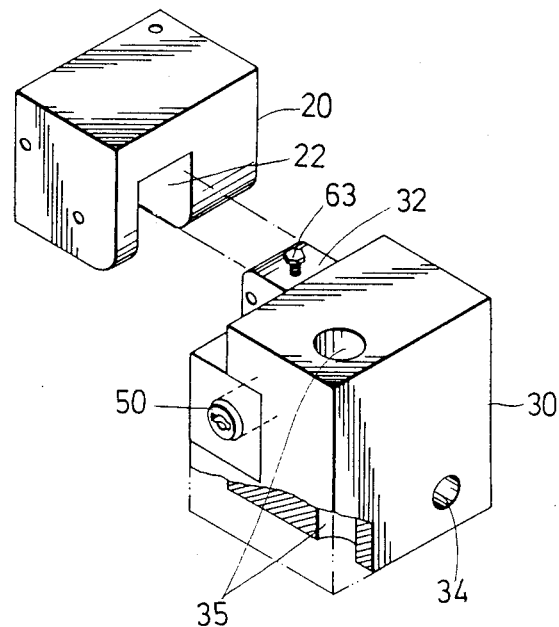
FIG. 3 is a perspective view, partially broken away, of a part of the first preferred embodiment of a car lock according to this invention.

Referring to FIGS. 1, 2, a car lock is shown for locking both the steering wheel 2 of a car 1 and a rectangular stereo receiver 3 detachably received in the dashboard 4 of the car 1, which is adjacent to said steering wheel 2, according to this invention. Said car lock includes a tube 13 having a first lock hook 14 formed near a closed end 131 thereof and an internally threaded portion 15 formed near an open end 132 thereof. A sliding member 10 is slidably mounted on the tube 13 and has a second lock hook 11 attached thereto so that when the sliding member 10 is moved away from the closed end 131 of said tube 13, the first lock hook 14 and the second lock hook 11 can be hooked at diametrically opposed positions on the steering wheel 2 of the car 1. A positioning rod 16 has an externally threaded portion 17 formed at one end thereof and a connecting member 20 fixed to the other end thereof. The externally threaded portion 17 of the positioning or fixing rod 16 is threaded to the internally threaded portion 15 of the tube 13 so that the connecting member 20 is located in front of the car stereo receiver 3. The connecting member 20 is a generally rectangular block having a notch 22 formed in the face thereof facing said stereo receiver 3. A positioning member 30, which is also a generally rectangular block, has a connecting portion 32 which is received in the notch 22 of the connecting member 20 and pivoted to said connecting member 20 by a pin 60 so that the positioning member 30 can swing toward and away from the tube 13. The positioning member 30 has a throughbore or channel 34 formed therein at a position which allows the second lock hook 11 to be passed therethrough when the first and second lock hooks 14, 11 are both hooked on the steering wheel 2 as hereinbefore described. A locking rod 40 is passed through a channel 35 formed in the positioning member 30 and has an abutting plate 41 pivotally connected to one end thereof which can be brought into contact with the stereo receiver 3 fitted in the dashboard 4. A lock mechanism 50 is provided in the positioning member 30 for locking both the second lock hook 11 and the locking rod 40 in said positioning member 30 in a manner as will be described in detailed later. In this way, the stereo receiver 3 received in the dashboard 4 can be locked against being pulled out from the dashboard 4 when the pushed rod 40 is locked in the positioning member 30 with the abutting plate 41 abutting against said stereo receiver 3. A screw bolt 63 is threaded onto the connecting portion 32 of the positioning member 30 which can be adjusted to protrude from said connecting portion 32 of said positioning member 30 and abut against an inner face of the connecting member 20 in the notch 22 so that the locking rod 40 is extended in a direction which is substantially perpendicular to the tube 13, as best illustrated in FIG. 2. In this position, the abutting plate 41 of the lock rod 40 can be moved to abut against the stereo receiver 3 so as to protect said stereo receiver 3 from being stolen.

Figure 4:
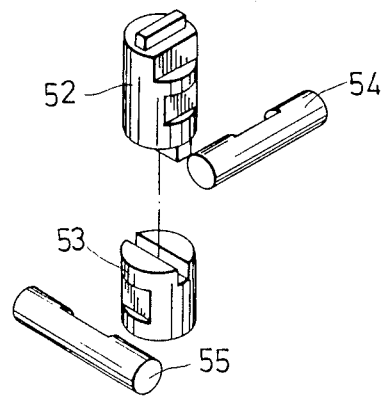
FIG. 4 is a perspective exploded view of a lock mechanism of a car of this invention.

Referring to FIG. 4, the lock mechanism 50 includes a first and a second cylinder 52, 53 rotatably mounted therein. FIG. 4 illustrates grooves provided in the first and second cylinders 52 and 53 which grooves mesh with slots provided in the first and second latches 54 and 55. Rotational movement of the first and second cylinders 52 and 53 causes the edges of the grooves to contact the slots of the latches. Further rotational movement of the first and second cylinder 52 and 53 causes translational movement of the first and second latches 54 and 55. As shown in FIG. 2, first and second latches 54, 55 are respectively driven by first and second cylinders 52, 53 so that the first and the second latches 54, 55 can respectively be inserted into the notches 111, 401 formed in the second lock hook 11 and the locking rod 40 for locking purposes when the first and second cylinders 52, 53 are simultaneously rotated by a key (not shown). In this respect, not only can the steering wheel 2 of the car 1 be locked against rotation, but the stereo receiver 3, detachably received in the dashboard 4, can also be locked against being pulled out from the dashboard 4 with the abutting plate 41 abutting against said stereo receiver 3.

In use, first, the lock mechanism 50 is unlocked. The sliding member 10 is moved to a position permitting the first and the second lock hooks 14, 11 to hook at diametrically opposed positions on the steering wheel 2 and the positioning member 30 is swung to a position where the abutting plate 41 of the locking rod 40 can be extended to abut against the stereo receiver 3. In this position, the head of the screw bolt 63 on the top of the connecting portion 32 of the positioning member 30 abuts against the connecting member 20 so that the locking rod 40 extends toward the stereo receiver 3 and is substantially perpendicular to the tube 13 as hereinbefore described. The lock mechanism 50 is then locked by rotating the first and second cylinders 52, 53, enabling the first and second latches 54, 55 to lock into the notches 111, 401 of the second lock hook 11 and the locking rod 40 so that said second lock hook 11 and said locking rod 40 are both positioned in the positioning member 30. Thereby, both the steering wheel 2 and the stereo receiver 3 of the car 1 can be locked.

Figure 5:
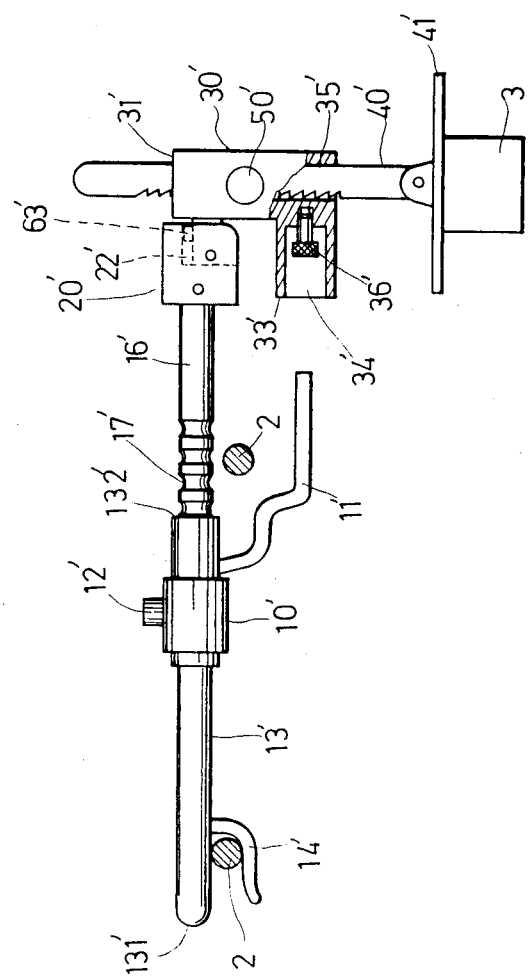
FIG. 5 is a partially sectional view of a second preferred embodiment of a car lock of this invention.

Referring to FIG. 5, a second preferred embodiment of a car lock of this invnetion includes a tube 13' having a first lock hook 14' attached near a closed end 131' thereof and a sliding member 10' slidably mounted thereto. A positioning rod 16' has annular grooves 17' provided on one end thereof which are slidably inserted into an open end 132' of the tube 13', and a connecting member 20' fixed to the other end thereof. A first lock mechanism 12' is provided in the sliding member 10' for locking into the annual grooves 17' of the positioning rod 16' so that the positioning rod 16' can be fixed relative to the tube 13'. A second lock hook 11' is mounted in the sliding member 10' so that the first and second lock hook 14', 11' can be locked at diametrically opposed positions on the steering wheel 2 when the sliding member 10' with the second lock hook 11', is moved toward the open end 132' of the tube 13', (i.e., away from the first lock hook 14').

Figure 6:
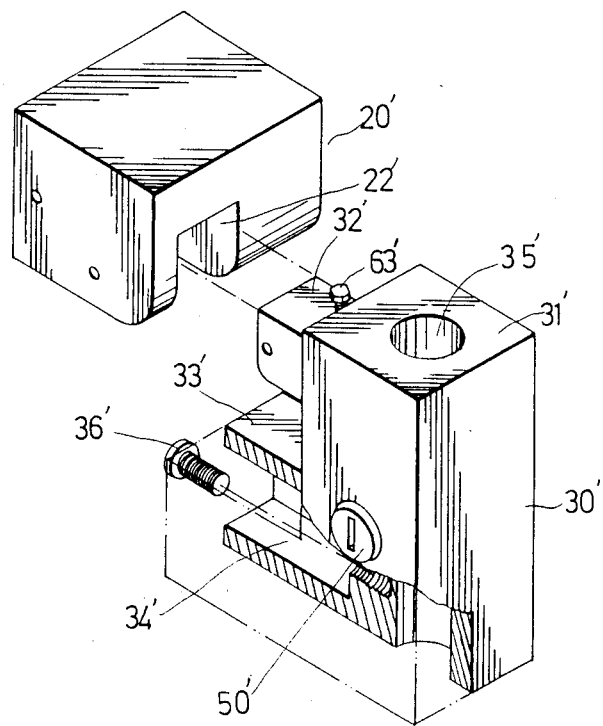
FIG. 6 is a partially perspective sectional exploded view, partially broken away, of a part of the second preferred embodiment of a car lock of this invention.

Referring to FIGS. 5 and 6, the connecting member 20', which is fixed to said other end of the positioning rod 16', has a structure similar to that of the first embodiment. A generally L-shaped positioning member 30' has a connecting portion 32' protruding therefrom and is pivoted to the connecting member 20' in the same manner as the positioning member 30 is pivoted to the connecting member 20 described in the first embodiment. A channel 34' is formed in one arm portion 33' of the L-shaped positioning member 30' and a throughbore 35' is formed in the other arm portion 31' which slidably receives a locking rod 40' having a abutting plate 41' pivoted to one end thereof. A second lock mechanism 50' is mounted in the L-shaped positioning member 30' for positioning the locking rod 40' relative to said L-shaped positioning member 30'. The L-shaped positioning member 30' is rotated to a position where a first adjusting screw bolt 63' is adjusted to abut against the bottom face of the notch 22' of the connecting member 20' so that the locking rod 40' is substantially perpendicular to the tube 13' and the channel 34' is substnatially parallel with said tube 13', as best illustrated in FIG. 5. In this position, the second lock hook 11' may be inserted into the channel 34' and locked on the steering wheel 2 as hereinbefore described, and the abutting plate 41' of the locking rod 40' may be moved to abut against the stereo receiver 3 fitted in the dashboard 4 (not shown). A second adjusting screw bolt 36' is mounted in the bottom portion of the channel 34' which can be adjusted to abut against the free end of the second lock hook 11' so that the L-shaped positioning member 30' may be positioned. In this way, the steering wheel 2 and the stereo receiver 3 can be locked in a manner as described hereinbefore when the first and second lock hooks 14', 11' are hooked on said steering wheel 2 and the abutting plate 41' of the locking rod 40' is abutted against said stereo receiver 3 with both the first and the second lock mechanisms 12', 50' in locked positions.

Figure 7:
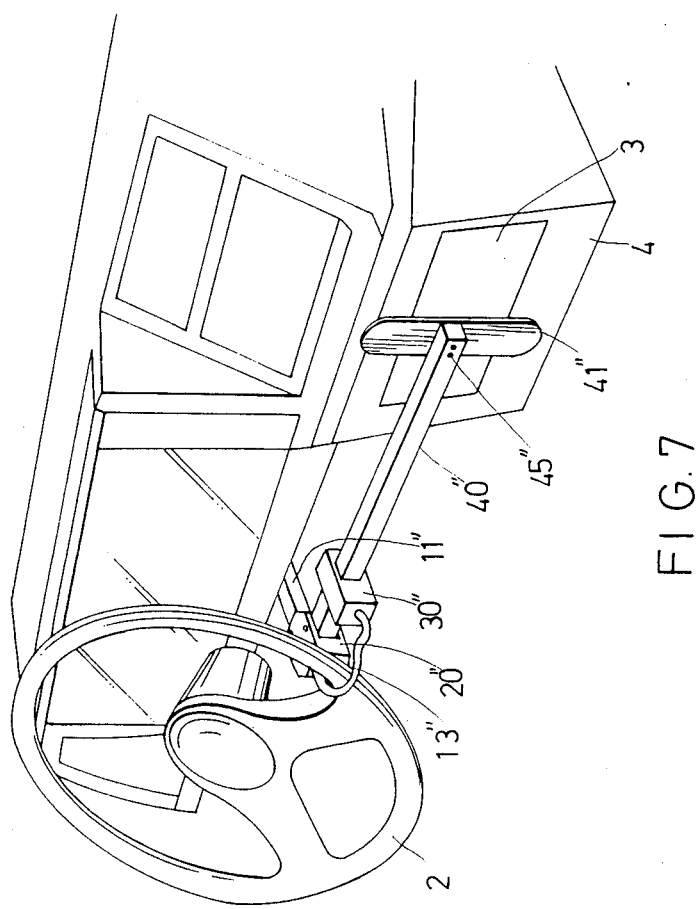
FIG. 7 is a schematic view showing a third preferred embodiment of a car lock of this invention in an operative position.
Figure 8:
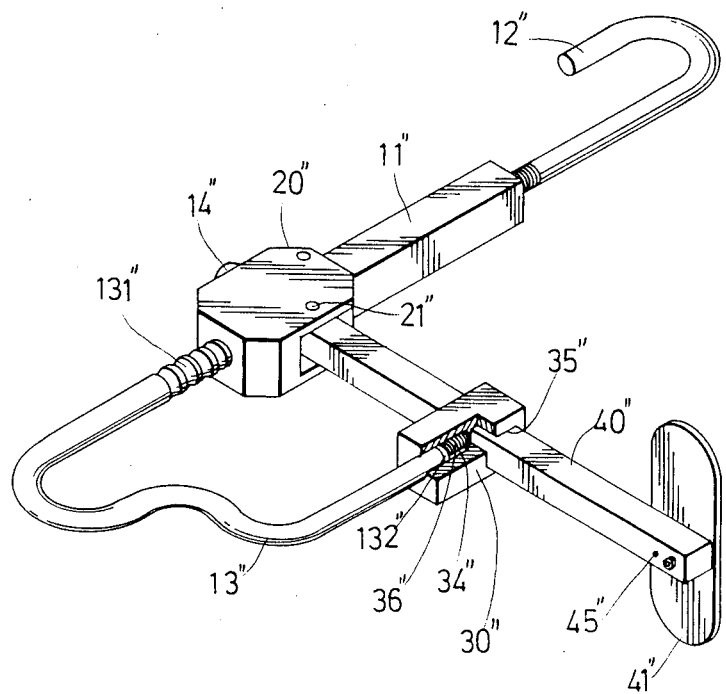
FIG. 8 is a perspective view, partially broken away, of the third preferred embodiment of a car lock of this invention.

Referring to FIGS. 7, 8, a third preferred embodiment of a car lock of this invention includes a rectangular tube 11" having a first lock hook 12" threadably connected to one end thereof and being capable of being adjusted to move to a position where the clutch pedal, the brake pedal, or the gas (not shown) of the car is hooked, and a generally hexagonal connecting member 20" is conencted to the other end thereof. A rectangular locking rod 40" is pivoted to the connecting member 20" at one end thereof by means of a pin, and extends generally perpendicular to said rectangular tube 11" at the other end thereof to which an abutting plate is attached so as to be positioned in front of the car stereo receiver 3 mounted in the dashboard 4, as illustrated in FIG. 7. A rectangular positioning member 30" has throughbore 35" formed therein which is adapted to receive by the rectangular locking rod 40" and a channel 34" which extends inwardly in a direction substantially perpendicular to the throughbore 35". An adjusting screw bolt 36" is threaded in the bottom of the channel 34" so that the depth of the channel can be adjusted. A second lock hook 13" has a first end 131" inserted into the connecting member 20" which is provided with annular grooves and a second end 132" inserted into the positioning member 30" for positioning purposes. A lock mechanism 14" is mounted to the connecting member 20" for locking said first end 131" of the second lock hook 13" so that said first end 131" of said second lock hook 13" can only be pushed into the connecting member 20" and be prevented from being pulled out from the connecting member 20" when the first end 131" of said second lock hook 13" is locked by said lock mechanism 14".

Figure 9:
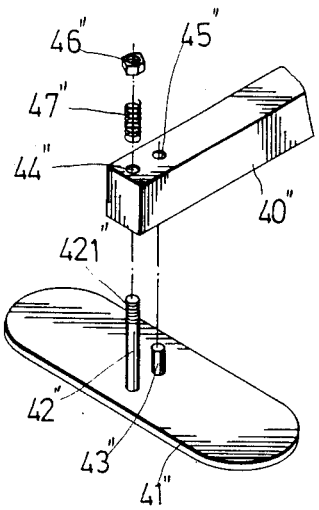
FIG. 9 is a perspective exploded view of a part of the third preferred embodiment of a car lock of this invention.
Figure 10:
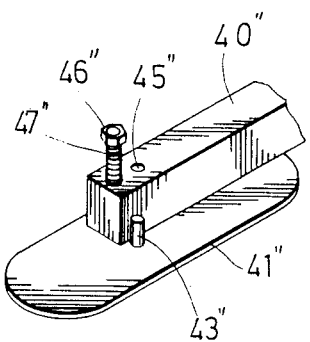
FIG. 10 is a perspective view of the part of the car lock shown in FIG. 9.

Referring to FIGS. 8, 9, the abutting plate 41" has a first protrusion rod 42" with a threaded end 421" passed through a first bore 44" formed in the end portion of the locking rod 40", and a coiled spring 47" which is restrained between said locking rod 40" and a nut 46" threaded to the threaded end 421" of the first protrusion rod 42". A second protrusion rod 43" is projected from the abutting plate 41" in the same direction the same as the first protrusion rod 42" and passed into a second bore 45", though the second protrusion rod 43" does not protrude out of the locking rod 40. Therefore, the abutting plate 41" cannot be rotated when the first and second protrusion rods 42", 43" are respectively inserted into the first and second bores 44", 45". However, the abutting plate 41" can be rotated about the first protrusion rod 42 when said abutting plate 41" is pulled away from the locking rod 40' to enable the second rod 43" to be pulled out of the second bore 45' of said locking rod 40". In this way, the abutting plate can be rotated 90 degrees to reduce the space occupied thereby at the end portion of the locking rod 40" when the car lock of this invention is transferred and/or stored, as best illustrated in FIG. 10.

In use, the first lock hook 12" is adjusted to hook the clutch pedal, the brake pedal, or the gas pedal of a car and the locking rod 40" is rotated to make the abutting plate 41 abut against the car stereo receiver 3 mounted in the dashboard 4. The positioning member 30" is then moved to a position enabling the first and the second ends 131", 131" of the second lock hook 13" to be respectively inserted into the connecting member 20" and the channel 34". The second lock hook 13" is pushed towards the connecting member 20" until said second lock hook 13" abuts upon the steering wheel located between said second lock hook 13" and the locking rod 40", and the the second end 132" thereof contacts the adjusting screw bolt 36". In this way, both the steering wheel 2 and the locking rod 40" cannot be rotated while the second lock hook 13" is snugly retained on the steering wheel 2 and the abutting plate 41" is snugly placed against the stereo receiver 3, as illustrated in FIG. 7. The first end 131" is then locked by the lock mechanism 14" in a manner as hereinbefore described. In this way, both the steering wheel 2 and the stereo receiver 3 are securely locked.

With this invention thus explained, it is apparent that numerous modifications and variations can be made without departing from the scope and spirit of this invention. It is therefore intended that this invention be limited only as indicated in the appended claims.

I claim:

1. A car lock for locking both a steering wheel of a car and a stereo receiver detachably received in a dashboard of said car, said car lock comprising:
    an elongated tube having a first end, to which a first lock hook is fixed and a second end, said elongated tube having a second lock hook movably mounted thereto;
    a locking rod having an abutting plate rotatably connected to an end thereof;
    means for pivotally interconnecting said locking rod and said second end of said elongated tube so that said locking rod can be rotated to a position substantially perpendicular to said elongated tube and said abutting plate can be brought into contact with said stereo receiver;
    a positioning member, which slidably receives said locking rod, having a channel formed therein extending in a direction substantially perpendicular to said locking rod so that said second lock hook can be inserted into said channel of said positioning member when said second lock hook is moved to hook the steering wheel and said locking rod is rotated to said position substantially perpendicular to said elongated tube; and
    means for preventing said locking rod from moving relative to said positioning member and preventing said second lock hook from moving relative to said elongated tube, so that said second lock hook and said locking rod can be locked;
    whereby said first lock hook is hooked on a predetermined portion of said car and said second lock hook is hooked on said steering wheel and inserted into said channel of said positioning member and said abutting plate is brought into contact with said stereo receiver, while said second lock hook and said locking rod are locked with respect to said elongated tube and said positioning member, so that said steering wheel can be locked against rotation and said stereo receiver, detachably received in said dashboard can be locked against being pulled out from said dashboard.

2. A car lock as claimed in claim 1, wherein said interconnecting means includes a connecting member fixed to said second end of said elongated tube, in which a notch is formed, a connecting portion formed on said positioning member which is received in said notch of said connecting member and a pin transversely fixed in said notch of said connecting member and passing through said connecting portion so that said positioning member can be pivoted about said pin.

3. A car lock as claimed in claim 2 further comprising a fixing rod interconnected between said second end of said elongated tube and said connecting member, said fixing rod being threadably connected to said second end of said elongated tube at one end thereof and fixed to said connecting member at the other end thereof.

4. A car lock as claimed in claim 1, wherein said interconnecting means includes a connecting member fixed to said second end of said elongated tube in which a notch is formed, and a pin transversely fixed in said notch of said connecting member and passing through an end of said locking rod which is remote from said abutting plate so that said locking rod can be pivoted on said connecting member.

* * * * *